B. M. W. HANSON.
TOOL HOLDER.
APPLICATION FILED MAR. 28, 1921.

1,406,006.

Patented Feb. 7, 1922.

Inventor
Bengt M. W. Hanson.

By

His Attorney

UNITED STATES PATENT OFFICE.

BENGT M. W. HANSON, OF HARTFORD, CONNECTICUT.

TOOL HOLDER.

1,406,006.　　　　　Specification of Letters Patent.　　Patented Feb. 7, 1922.

Application filed March 28, 1921. Serial No. 456,382.

*To all whom it may concern:*

Be it known that I, BENGT M. W. HANSON, a citizen of the United States, residing at Hartford, in the county of Hartford, State of Connecticut, have invented certain new and useful Improvements in a Tool Holder, of which the following is a specification.

It is customary to secure shanks of tools, for instance milling cutters, in the bore of rotatable spindles by means of spring or jaw collets. As such collets are interposed between the wall of the spindle bore and the tool shank it will be evident that the latter must be considerably smaller in diameter than the bore of the spindle. Not infrequently, it happens that the work to be performed requires a tool having a shank of larger diameter than the collet of a particular machine will take and for this reason the machine cannot be used although in other respects it is of sufficient capacity to take care of the particular piece of work at hand.

In accordance with the present invention an improved arrangement is provided whereby tool shanks of large sizes and especially those of substantially the same diameter as the bore of the spindle can be readily and securely held in place in the spindle. The present invention is adapted to be used in connection with spindles constructed also for use with the usual collets and thus the range of utility of the metal working machine of which the spindle forms a part is greatly increased in so far as it is possible to mount tool shanks varying greatly in diameter from one another in the spindle.

Figure 1:
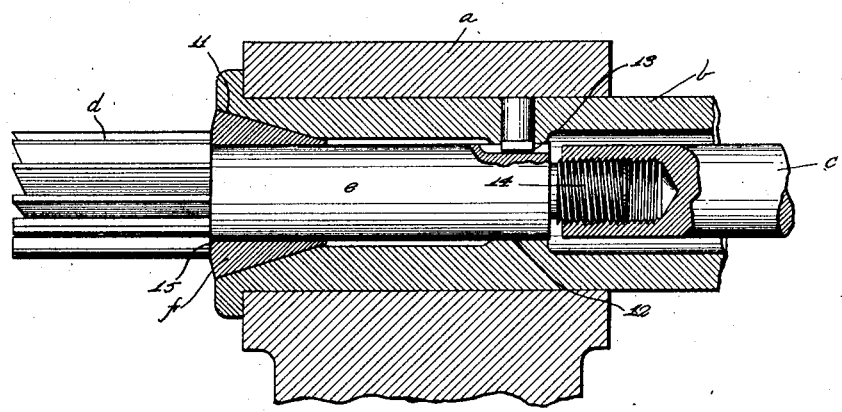
Figure 2:
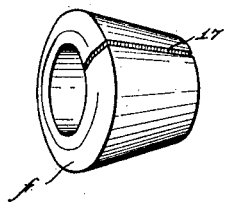

In the accompanying drawing:

Fig. 1 is a view taken longitudinally and centrally through a spindle to which the device of the present invention is applied, and Fig. 2 is a perspective view of a collar forming a part of the present device.

Referring to the drawing in detail, $a$ is a bearing in which is mounted a spindle $b$ having, as is usual, a central bore terminating at its outer end in a tapered recess 11. $c$ is a draw-bar having a threaded recess at its forward end. The letter $d$ denotes a tool, for instance a milling cutter, having a shank $e$ of substantially the same diameter as the bore of the spindle so as to have a close supporting fit therein as at 12. The tool shank is keyed to the spindle as at 13 to hold the parts against relative rotary movement and the inner end 14 of the shank is threaded for engagement with the bar $c$. Fitting about the tool shank and abutting against a shoulder 15 provided by the rear end of the tool $d$ is a collar $f$ preferably corresponding in shape to the recess 11 so as to closely fit therein. This collar may be split as at 17 so that it is contractible.

It will be understood that when the draw-bar $c$ is turned in the proper direction, it will draw the tool inwardly of the spindle whereupon the collar $f$, owing to the tapering walls of the recess 11, will be contracted and caused to tightly grip the tool shank. The tool will then have rigid bearings in the collar and as at 12 in the spindle bore so that the tool is securely held against vibration.

It is, of course, obvious that my invention is susceptible of various modifications and changes which are within the spirit of the invention without departing from the scope of the following claims, it being understood that the present disclosure of my invention is by way of illustration only and it is not to be taken as restrictive of my conception.

I claim as my invention:

1. In a device of the character described, a rotating spindle having a bore terminating at its outer end in a tapered recess, a tool provided with a shank positioned within said bore, a collar about said shank and fitting within said recess, and means for drawing said tool shank and collar inwardly of the spindle.

2. In a device of the character described, a rotating spindle having a bore terminating at its outer end in a tapered recess, a tool provided with a shank having a close fitting bearing in said bore, a collar about said shank and fitting within said recess, and means for drawing said tool shank and collar inwardly of the spindle.

3. In a device of the character described, a rotating spindle having a bore terminating in a conical recess at its outer end, a tool having a shank fitting closely within the bore of said spindle, a split collar about said shank and fitting within said recess, said shank having a shoulder against which the outer end of said collar engages, and means for drawing said shank inwardly of the spindle.

4. In a device of the character described, a rotating spindle having a bore terminating at its outer end in a tapered recess, a tool provided with a shank positioned within said bore, a collar about said shank and fitting within said recess, means for keying said shank to said spindle, and means for drawing said tool shank and collar inwardly of the spindle.

5. In a device of the character described, a spindle having a bore terminating at its forward end in a tapered recess, a tool having a shank fitting closely in said bore, a split collar about said shank and corresponding in shape to and fitting within said recess, means for keying said shank to said spindle, the rear end of said tool constituting a shoulder engaging said collar, and a draw-bar in threaded engagement with said shank.

6. In a device of the character described, a rotating spindle having a bore terminating at its outer end in a tapered recess, a tool provided with a shank having a close fitting bearing in said bore, a collar about said shank and fitting within said recess, means for keying said shank to said spindle, and means for drawing said tool shank and collar inwardly of the spindle.

BENGT M. W. HANSON.